United States Patent
Kwon

(10) Patent No.: US 7,809,684 B2
(45) Date of Patent: Oct. 5, 2010

(54) ELECTRONIC DEVICE HAVING FILE RESTORE FUNCTION AND METHOD THEREOF

(75) Inventor: Tae-won Kwon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 436 days.

(21) Appl. No.: 11/806,575

(22) Filed: Jun. 1, 2007

(65) Prior Publication Data

US 2008/0120353 A1 May 22, 2008

(30) Foreign Application Priority Data

Nov. 21, 2006 (KR) .................. 10-2006-0115321

(51) Int. Cl.
G06F 7/00 (2006.01)
G06F 17/00 (2006.01)

(52) U.S. Cl. .................. 707/640; 707/654; 707/679

(58) Field of Classification Search .................. 707/200, 707/204, 609, 640, 654, 674, 679
See application file for complete search history.

(56) References Cited

U.S. PATENT DOCUMENTS

| | | | | |
|---|---|---|---|---|
| 6,301,666 | B1 * | 10/2001 | Rive | 726/27 |
| 6,317,755 | B1 * | 11/2001 | Rakers et al. | 1/1 |
| 7,461,223 | B2 * | 12/2008 | Anand et al. | 711/162 |
| 7,523,280 | B2 * | 4/2009 | Ooshima et al. | 711/163 |
| 2006/0008167 | A1 * | 1/2006 | Yu et al. | 382/250 |
| 2008/0077808 | A1 * | 3/2008 | Teicher et al. | 713/193 |

* cited by examiner

*Primary Examiner*—Don Wong
*Assistant Examiner*—Angela M Lie
(74) *Attorney, Agent, or Firm*—Roylance, Abrams, Berdo & Goodman, L.L.P.

(57) ABSTRACT

An electronic device having a file restore function and a method thereof are provided. The electronic device includes a formatting unit for performing a backup of data that is used for file management in a backup region of a recording medium, and formatting the recording medium by initializing a region in which the data is recorded; and an unformatting unit for unformatting the recording medium by restoring the backup data in the backup region. Accordingly, files recorded in the recording medium can be all restored by unformatting the formatted recording medium.

13 Claims, 5 Drawing Sheets

ELECTRONIC DEVICE HAVING FILE RESTORE FUNCTION AND METHOD THEREOF

CROSS-REFERENCE TO RELATED APPLICATIONS

This application claims benefit under 35 U.S.C. §119(a) of Korean Patent Application No. 2006-115321, filed Nov. 21, 2006, in the Korean Intellectual Property Office, the entire disclosure of which is hereby incorporated by reference.

BACKGROUND OF THE INVENTION

1. Field of the Invention

The present invention relates to an electronic device having a file restore function and a method thereof. More particularly, the present invention relates to an electronic device having a file restore function and a method thereof, which can restore a file to its original state after the storage medium on which the file exists has been formatted by unformatting the formatted file.

2. Description of the Related Art

A file system refers to a method or software supporting the method, which names a file and indicates where to logically position the file in order to store or retrieve the file. Most operating systems such as DOS, Windows, Linux, Unix, Macintosh, and so forth, support a file allocation table (FAT) file system.

FIG. 1 is a view illustrating the structure of a general file system.

The file system as illustrated in FIG. 1 has the structure of a FAT file system which includes a reserved region, a FAT region, a root region, and a data region.

The reserved region is a region which is not in use and is reserved for future use, or in which special information desired by a user is recorded. The FAT region is a region for storing or retrieving a file, and in the FAT region, tables for managing clusters in the data region are gathered. The FAT region includes a first FAT region and a second FAT region that is a backup copy of the first FAT region.

The root region is a region in which a directory entry including the name, start cluster, and size of a root folder is stored. In FAT12 or FAT16, the root region exists separately. However, in FAT32, the root region does not exist separately, but the directory entry of the root folder is stored in a region corresponding to one cluster among a part of the data region, the position of which is the same as that of the root region in FAT12 or FAT16.

The data region is a region from/in which actual data is read/written in the logical unit of a cluster. In the case of a sub-folder, the directory entry of the sub-folder is stored after one cluster of the data region.

In order to initialize the file system as described above, full formatting or quick formatting is performed. Full formatting initializes the whole storage region of a recording medium, and thus it is impossible to restore data after a full formatting is performed. Quick formatting initializes only a part of the whole region, and thus it may be possible to restore data after a quick formatting is performed, depending on circumstances.

FIG. 2 is a flowchart explaining a general file formatting method.

In FIG. 2, quick formatting is exemplified. If a format command is inputted to an electronic device at step (S10), a reserved region is initialized at step (S30). In other words, data recorded in the reserved region is deleted. A FAT region is initialized at step (S50). That is, tables for managing clusters recorded in the FAT region are deleted.

Last, a root region or a part of a data region that corresponds to the root region is initialized at step (S70). That is, in the case of FAT12 or FAT16, the directory entry recorded in the root region is deleted, while in the case of FAT32, data recorded in a region that corresponds to one cluster of the data region is deleted.

As described above, in the formatting process, the directory entry including the name, start cluster, and size of a root folder is deleted, and the tables for managing the clusters of the data region are all deleted. Accordingly, it is impossible for a user to restore the data recorded in the data region, and thus the user may lose his/her important information.

In the case of a sub-folder, since the directory entry is stored after one cluster of the data region, they are not deleted during the formatting process, but the tables for managing the clusters recorded in the FAT region are all deleted. Accordingly, it is impossible for a user to restore the data unless the data is backed up by the user before being formatted.

SUMMARY OF THE INVENTION

Exemplary embodiments of the present invention address at least the above described problems and/or disadvantages and provide at least the advantages described below. Accordingly, an aspect of exemplary embodiments of the present invention is to provide an electronic device having a file restore function and a method thereof, which can initialize a recording medium in which data is stored by supporting an unformatting function that makes the data stored before being formatted fully recoverable.

According to exemplary embodiments of the present invention, an electronic device is provided comprising a formatting unit for performing a backup of data that is used for file management in a backup region of a recording medium, and formatting the recording medium by initializing a region in which the data is recorded; and an unformatting unit for unformatting the recording medium by restoring the backup data in the backup region.

The formatting unit preferably performs the backup of data, which is recorded in any one of a root region of the recording medium and a data region that corresponds to the root region, a reserved region, and a file allocation table (FAT) region, in the backup region.

The formatting unit may record the size of a usable region, which is the remaining region obtained by subtracting the backup region from the whole region of the recording medium, in the reserved region.

The unformatting unit may determine that the backup region exists if the size of the usable region in the recording medium is smaller than the whole region of the recording medium, and unformat the recording medium by restoring the backup data in the backup region.

By contrast, the unformatting unit may determine that the backup region does not exist if the size of the usable region in the recording medium is larger than or equal to the whole region of the recording medium.

The electronic device according to embodiments of the present invention may further comprise an image capturing unit for performing photoelectric conversion of an optical image formed through a lens into an electric signal and processing the converted electric signal to produce an image signal, an image signal processing unit for compressing the image signal produced from the image capturing unit into an image file, and a control unit for controlling the image signal processing unit to compress the file in a specified format and to store the compressed file in the recording medium.

According to exemplary embodiments of the present invention, a method is provided of restoring a file in an electronic device, which comprises performing a backup of data that is used for file management in a backup region of a recording medium; formatting the recording medium by initializing a region in which the data is recorded; and unformatting the recording medium by restoring the backup data in the backup region.

The step of performing a backup of data preferably comprises performing the backup of the data, which is recorded in any one of a root region of the recording medium and a data region that corresponds to the root region, a reserved region, and a file allocation table (FAT) region, in the backup region.

The method of restoring a file according to embodiments of the present invention may further comprise recording the size of a usable region, which is the remaining region obtained by subtracting the backup region from the whole region of the recording medium, in the reserved region.

The step of unformatting the recording medium may comprise determining that the backup region exists if the size of the usable region in the recording medium is smaller than the whole region of the recording medium, and unformatting the recording medium by restoring the backup data in the backup region.

The step of unformatting the recording medium may further comprise determining that the backup region does not exist if the size of the usable region in the recording medium is larger than or equal to the whole region of the recording medium.

The method of restoring a file according to embodiments of the present invention may further comprise performing photoelectric conversion of an optical image formed through a lens into an electric signal and processing the converted electric signal to produce an image signal, compressing the image signal into an image file, and compressing the file in a specified format and storing the compressed file in the recording medium.

According to still another aspect of embodiments of the present invention, there is provided a computer-readable recording medium recorded with a program that can perform a backup of data that is used for file management in a backup region of a recording medium; formatting the recording medium by initializing a region in which the data is recorded; and unformatting the recording medium by restoring the backup data in the backup region.

BRIEF DESCRIPTION OF THE DRAWINGS

The above and other exemplary features and advantages of the present invention will become more apparent from the following detailed description of certain exemplary embodiments thereof when taken in conjunction with the accompanying drawings, in which.

Throughout the drawings, like reference numbers should be understood to refer to like elements, features, and structures.

DETAILED DESCRIPTION OF EXEMPLARY EMBODIMENTS

The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope and spirit of the claimed invention. Descriptions of well-known functions and constructions are omitted for clarity and conciseness.

Figure 1:
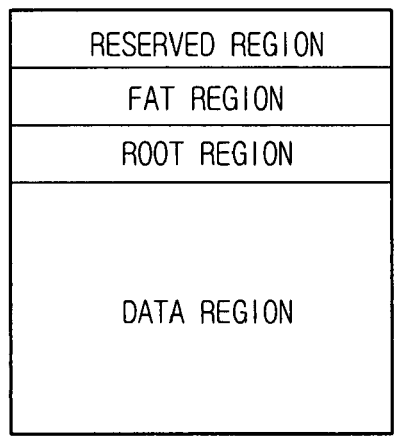
FIG. 1 is a view illustrating the structure of a conventional file system.
Figure 2:
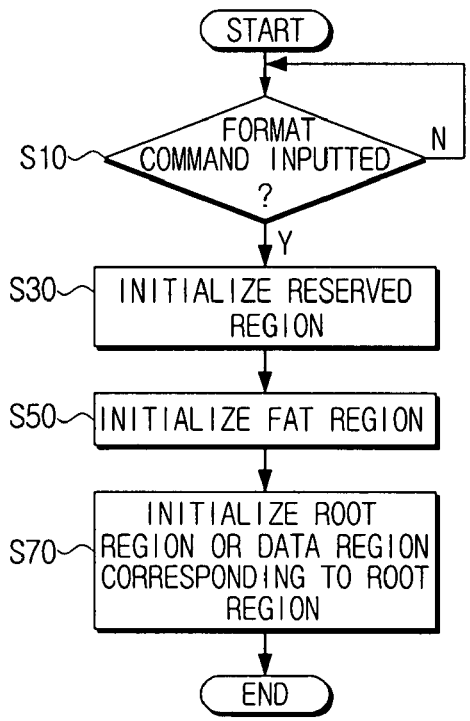
FIG. 2 is a flowchart explaining a conventional file formatting method.
Figure 3:
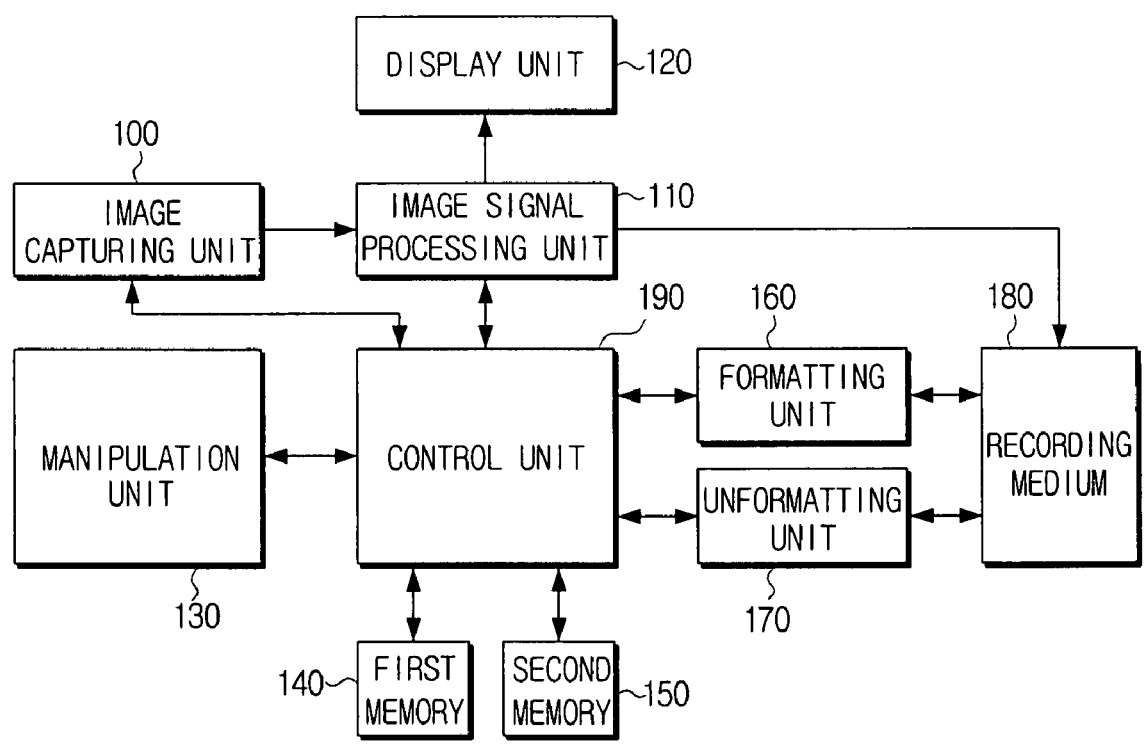
FIG. 3 is a block diagram schematically illustrating the construction of an electronic device according to an embodiment of the present invention.

FIG. 3 is a block diagram schematically illustrating the construction of an electronic device according to an exemplary embodiment of the present invention.

Referring to FIG. 3, an image capturing device is illustrated as the electronic device according to the present invention. Those of ordinary skill in the art will readily appreciate, however, that the principals of the present invention may be applied to any suitable electronic device. The image capturing device comprises an image capturing unit 100, an image signal processing unit 110, a display unit 120, a manipulation unit 130, a first memory 140, a second memory 150, a formatting unit 160, an unformatting unit 170, a recording medium 180, and a control unit 190.

The image capturing unit 100 performs photoelectric conversion of an optical image incident through a lens (not illustrated) into an electrical signal through photoelectric conversion device such as a charge coupled device (CCD) (not illustrated), and processes the converted electrical signal in accordance with conditions such as auto exposure (AE), auto focus (AF), auto white balance (AWB), and so forth, to produce an image signal. The image capturing unit 100 also typically performs digital signal processing of the produced image signal.

The image signal processing unit 110 processes the digital image signal outputted from the image capturing unit 100 to display the image signal through the display unit 120, or compresses the image signal into an image or video file, preferably in JPEG or MPEG format.

The manipulation unit 130 is provided with various kinds of keys for inputting user's commands. The manipulation unit 130 receives various kinds of commands for controlling the operation of the image capturing device from a user, and transfers corresponding signals to the control unit 190 to be described later. For example, a format command and an unformat command are transferred to the control unit 190 through the manipulation unit 130.

In the first memory 140, program sources required to perform the operation of the image capturing device and setting information set by the user are stored. A flash memory or an electrically erasable and programmable read only memory (EEPROM) is preferably used as the first memory 140.

In the second memory 150, data generated while the control unit 190 controls the operation of the image capturing device is temporarily stored. Random Access Memory (RAM) is preferably used as the second memory 150.

In the recording medium 180, a file compressed through the image signal processing unit 110 is stored. An optical recording medium such as a digital versatile disk (DVD), a memory card, or a hard disk drive (HDD) may be used as the recording medium 180. In the case where the file is stored in the recording medium 180 in accordance with the structure of a file allocation table (FAT) file system, the recording medium 180 includes a reserved region, a FAT region, a root region, and a data region, and data used for file management are stored in the respective regions.

More specifically, the reserved region may be reserved for later use, or may be recorded with the whole capacity or the actually usable capacity of the recording medium 180. The FAT region includes a first FAT region in which tables for managing clusters are gathered, and a second FAT region which is a backup copy of the first FAT region that is provided in case of damage to the first FAT region. In the root region, a directory entry including the name, start cluster, and size of a folder or file is stored. In the case of FAT32, no root region exists separately.

In the data region, an actual file is stored, and in the case of FAT32, the directory entry is stored in the data region that corresponds to the root region. In the case of a sub-folder, not the root folder, the directory entry is stored after one cluster of the data region.

The formatting unit 160, under the control of the control unit 190 to be described later, calculates the size of the backup region, and performs the backup of the data, which are recorded in the reserved region, the FAT region, and the root region (in the case of FAT32, the data region corresponding to the root region), in the backup region. The formatting unit 160 initializes the reserved region, the FAT region, and the root region (or the data region corresponding to the root region).

The size of the backup region is equal to the sum of the reserved region, the FAT region, and the root region (or the data region corresponding to the root region), and thus a region obtained by subtracting the backup region from the whole region of the recording medium 180 becomes the actually usable region. The capacity of the actually usable region as calculated above is preferably recorded in the reserved region after the recording medium 180 is formatted. When the recording medium 180 is unformatted, the existence/nonexistence of the backup regions is preferably determined using the usable capacity recorded in the reserved region.

The minimum size of the backup region is equal to the sum of the region being initialized among the reserved region, the first FAT region, and the root region (in the case of FAT32, the initialized region among the data region).

The unformatting unit 170, under the control of the control unit 190, determines whether the backup region exists in the recording medium 180. If it is determined that the backup region exists, the unformatting unit 170 restores the file using the data recorded in the backup region. That is, the unformatting unit 170 restores the data recorded in the backup region to the reserved region, the FAT region, and the root region (or the data region corresponding to the root region). Also, the unformatting unit 170 restores the file using the restored data in the reserved region, the FAT region, and the root region (or the data region corresponding to the root region).

If it is determined that the size of the usable region recorded in the reserved region is smaller than the size of the whole region of the recording medium 180, the unformatting unit 170 determines that the backup region exists. By contrast, if it is determined that the size of the usable region recorded in the reserved region is larger than or equal to the size of the whole region of the recording medium 180, the unformatting unit 170 determines that no backup region exists.

The control unit 190 controls the operation of the image capturing device in accordance with the user's command inputted through the manipulation unit 130. That is, the control unit 190 controls the image capturing unit 100 to perform the image capturing operation, and controls the image signal processing unit 110 to compress the image signal from the image capturing unit 100 into a specified file and to store the compressed file in the recording medium 180. Also, if the format command is inputted, the control unit 190 controls the formatting unit 160 to format the recording medium 180, while if the unformat command is inputted, it controls the unformatting unit 170 to unformat the recording medium 180.

Figure 4:
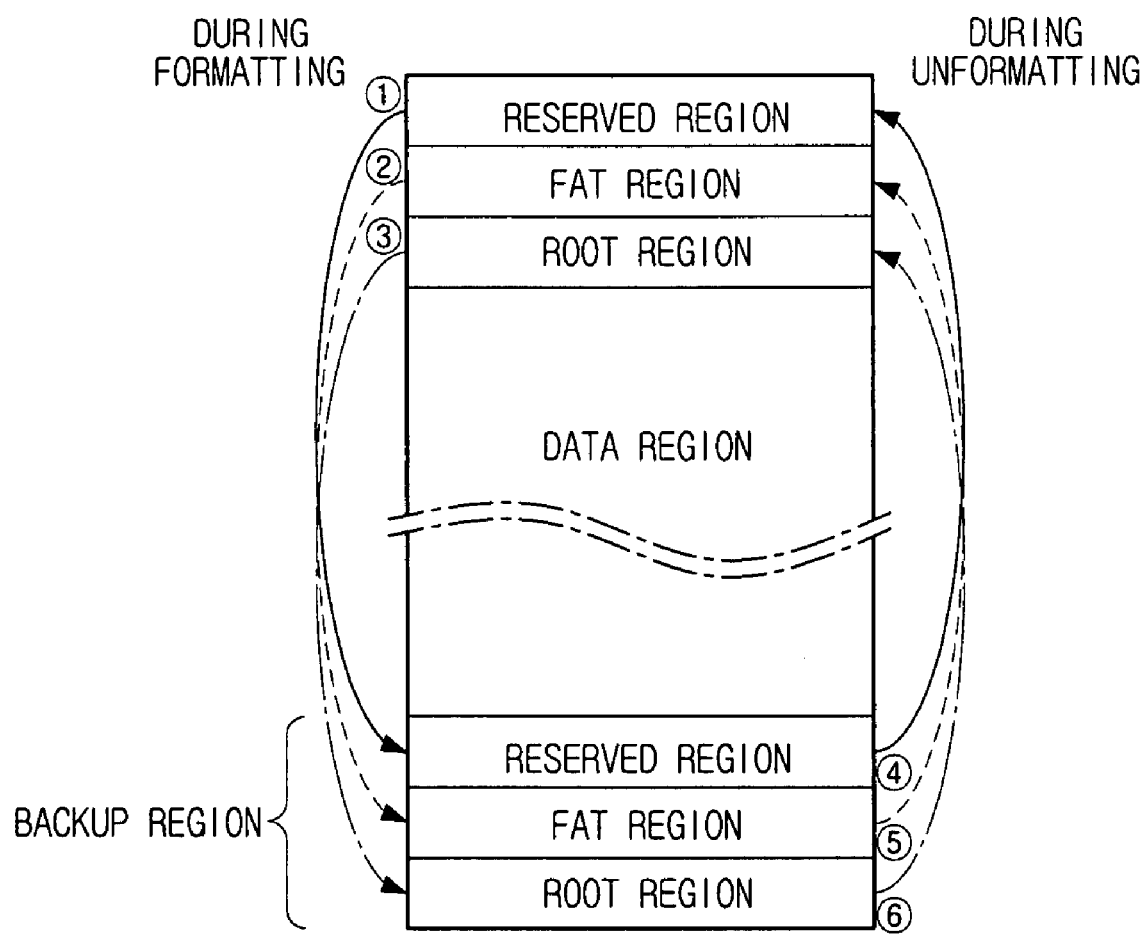
FIG. 4 is a view explaining a file formatting/unformatting method according to an embodiment of the present invention.

FIG. 4 is a view explaining a file formatting/unformatting method according to an exemplary embodiment of the present invention.

Referring to FIG. 4, during the formatting operation, the data recorded in the reserved region of the recording medium 180 is copied into the reserved region of the backup region by the formatting unit 160 (①). The data recorded in the FAT region is copied into the FAT region of the backup region (②), and the data recorded in the root region is copied into the root region of the backup region (③). At this time, if the FAT32 file system is applied to the recording medium 180, no root region exists, and thus the data recorded in the data region that corresponds to the root region is copied into the root region of the backup region.

During the unformatting operation, the data copied into the reserved region of the backup region is restored to the reserved region (④), and the data copied into the FAT region of the backup region is restored to the FAT region (⑤). The data copied into the root region of the backup region is restored to the root region (⑥). At this time, if the FAT32 file system is applied to the recording medium 180, the data copied into the root region of the backup region is restored to the data region.

Figure 5:
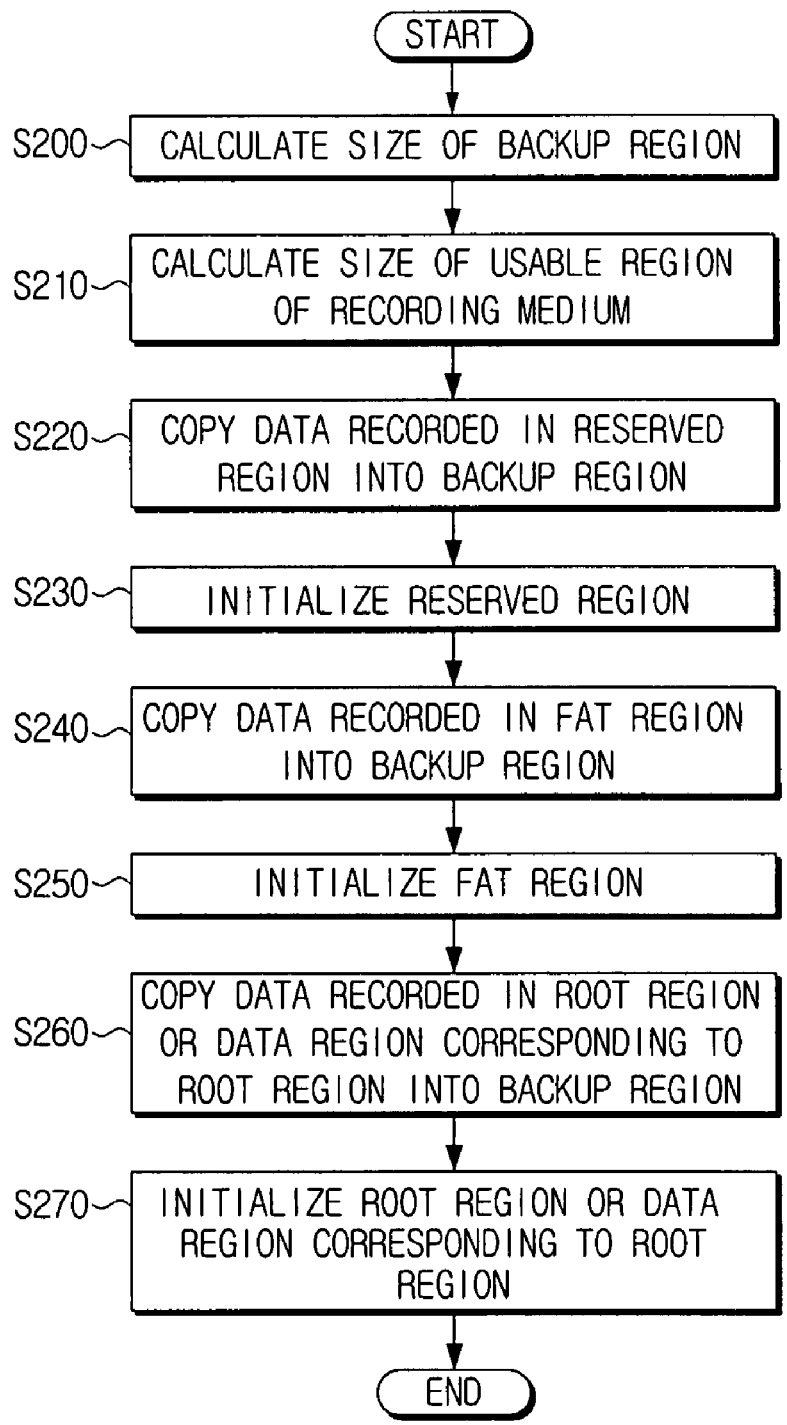
FIG. 5 is a flowchart illustrating a file formatting method according to an embodiment of the present invention.

FIG. 5 is a flowchart illustrating a file formatting method according to an exemplary embodiment of the present invention.

Referring to FIG. 5, the formatting unit 160 determines the backup region by calculating the size of the backup region at step (S200). The formatting unit 160 also calculates and stores the size of the actually usable region of the recording medium 180 in the reserved region at step (S210). The formatting unit 160 copies the data recorded in the reserved region into the backup region at step (S220), and then initializes the reserved region at step (S230). The formatting unit 160 copies the data recorded in the FAT region into the backup region at step (S240), and then initializes the FAT region at step (S250).

If the recording medium 180 supports the FAT12 or FAT16 file system, the formatting unit 160 copies the data recorded in the root region into the backup region, while if the recording medium 180 supports the FAT32 file system, it copies the data recorded in the data region that corresponds to the root region into the backup region at step (S260), and then initializes the root region or the data region that corresponds to the root region at step (S270).

Through the above-described process, the formatting unit 160 performs the formatting of the recording medium 180.

Figure 6:
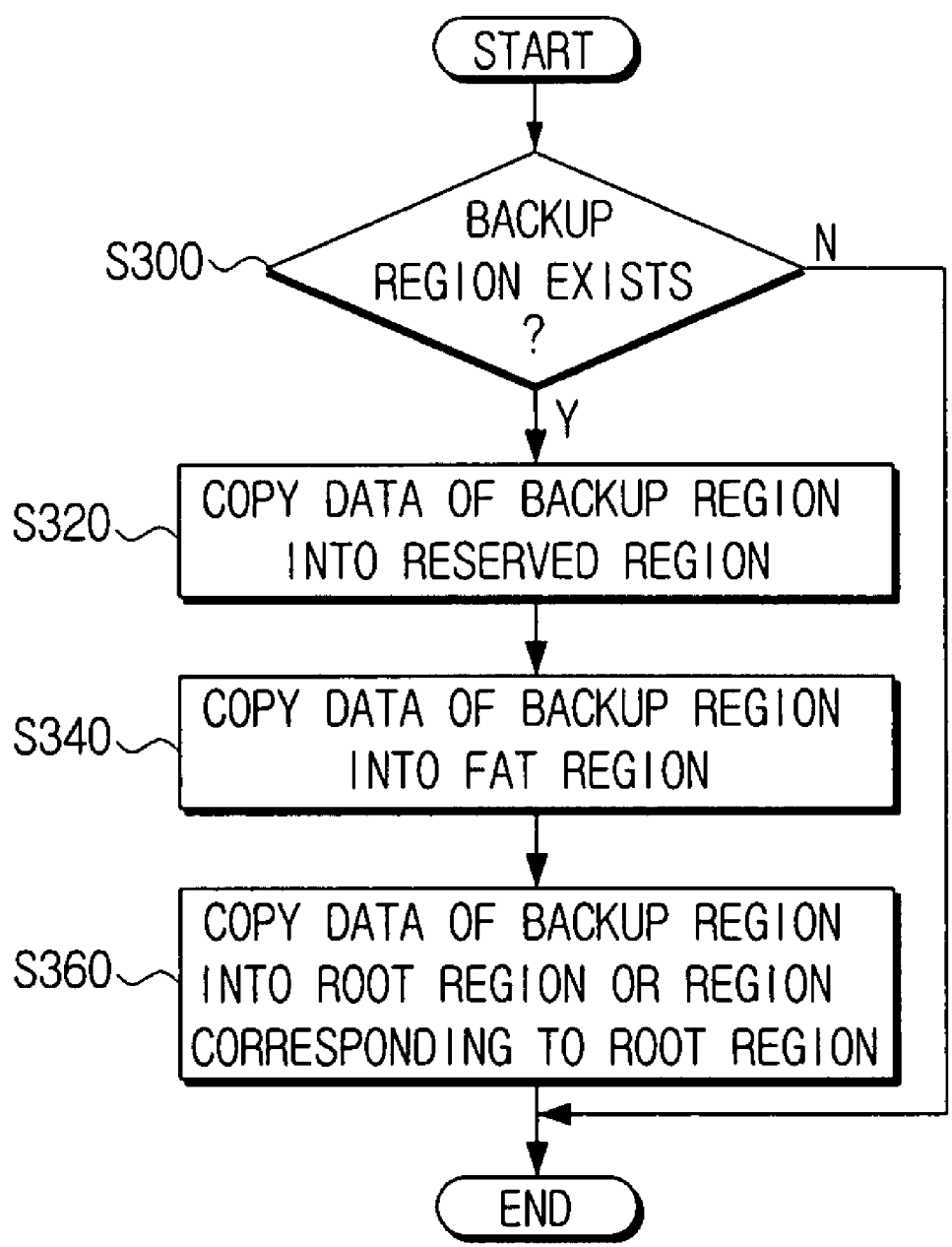
FIG. 6 is a flowchart illustrating a file unformatting method according to an embodiment of the present invention.

FIG. 6 is a flowchart illustrating a file unformatting method according to an exemplary embodiment of the present invention.

Referring to FIG. 6, the unformatting unit 170 determines whether the backup region exists in the recording medium 180 at step (S300). Specifically, if the size of the actually usable region recorded in the reserved region is smaller than the size of the whole region of the recording medium 180, the unformatting unit 170 determines that the backup region exists. By contrast, if the size of the actually usable region recorded in the reserved region is larger than or equal to the size of the whole region of the recording medium 180, the unformatting unit 170 determines that no backup region exists.

The unformatting unit 170 restores the data in the backup region to the reserved region at step (S320), and restores the data in the backup region to the FAT region at step (S340). If the recording medium 180 supports the FAT12 or FAT16 file system, the unformatting unit 170 restores the data recorded in the backup region to the root region, while if the recording medium 180 supports the FAT32 file system, it restores the data recorded in the backup region to the data region that corresponds to the root region at step (S360).

Through the above-described process, the unformatting unit 170 can restore the file.

If the recording medium 180, which has been formatted by an electronic device (hereinafter referred to as "another device") that does not adopt the file restoring method according to an exemplary embodiment of the present invention, is installed in an electronic device, no backup region exists in the recording medium 180, and thus it is impossible to directly restore the file. However, if the recording medium 180 formatted by another device is once formatted by the electronic device according to an exemplary embodiment of the present invention after it is used in another device or it is installed and used in an electronic device according to an exemplary embodiment of the present invention, the file can be restored except for the backup region.

If the recording medium 180 is formatted through the process as illustrated in FIG. 5 in an electronic device according to an exemplary embodiment of the present invention, all the files stored in the recording medium 180 can be perfectly restored through the unformatting process as illustrated in FIG. 6.

The file restoring method as described above may be implemented by a computer program. Since those skilled in the art can easily effect such implementation on the basis of the information as described above, the detailed description thereof will be omitted.

As described above, according to exemplary embodiments of the present invention, a part of data stored before being formatted is copied into a backup region, and the data copied into the backup region is restored during an unformatting operation, so that files stored in a recording medium can be all restored to offer convenience to a user who uses the recording medium.

While the present invention has been particulary shown and described with reference to certain exemplary embodiments thereof, it will be understood by those of ordinary skill in the art that various changes in form and detail may be made therein without departing from the spirit and scope of the present invention as defined by the appended claims and equivalents thereof.

What is claimed is:

1. An electronic device having a recording medium including a whole region having a usable region and a backup region for storing data, the electronic device comprising:
   a formatting unit for performing a backup of data recorded in the usable region of the recording medium in the backup region of the recording medium, and formatting the recording medium by initializing the usable region in which the data is recorded; and
   an unformatting unit for unformatting the recording medium by restoring the backup data in the backup region to the useable;
   wherein the formatting unit designates a size of the backup region using at least one of a root region, a reserved region, and a file allocation table region and performs a backup of data which is included in the usable region in the designated backup region; and
   wherein the data is used for file management and is included in at least one of the root region, the reserved region, and the file allocation table region.

2. The electronic device of claim 1, wherein the formatting unit performs the backup of the data, which is recorded in any one of a root region of the recording medium and a data region that corresponds to the root region, a reserved region, and a file allocation table (FAT) region, in the backup region.

3. The electronic device of claim 1, wherein the formatting unit records the size of the usable region, which is a remaining region obtained by subtracting the backup region from the whole region of the recording medium, in a reserved region.

4. The electronic device of claim 1, wherein if the size of the usable region in the recording medium is smaller than the whole region of the recording medium, the unformatting unit determines that the backup region exists, and unformats the recording medium by restoring the backup data in the backup region.

5. The electronic device of claim 1, wherein the unformatting unit determines that the backup region does not exist if the size of the usable region in the recording medium is larger than or equal to the whole region of the recording medium.

6. The electronic device of claim 1, further comprising:
   an image capturing unit for performing photoelectric conversion of an optical image formed through a lens into an electric signal, and processing the converted electric signal to produce an image signal;
   an image signal processing unit for compressing the image signal produced from the image capturing unit into an image file; and
   a control unit for controlling the image signal processing unit to compress the file in a specified format and to store the compressed file in the recording medium.

7. A method of restoring a file in an electronic device having a recording medium including a whole region having a usable region and a backup region for storing data, the electronic device comprising:
   designating a size of the backup region using at least one of a root region, a reserved region, and a file allocation table region;
   performing a backup of a data which is included in the usable region in the designated backup region;
   formatting the recording medium by initializing the usable region in which the data is recorded; and
   unformatting the recording medium by restoring the backup data in the backup region to the usable region;
   wherein the data is used for file management and is included in at least one of the root region, the reserved region, and the file allocation table region.

8. The method of claim 7, wherein the step of performing a backup of data comprises performing the backup of the data, which is recorded in any one of a root region of the recording medium and a data region that corresponds to the root region, a reserved region, and a file allocation table (FAT) region, in the backup region.

9. The method of claim 7, further comprising recording the size of a usable region, which is the remaining region obtained by subtracting the backup region from the whole region of the recording medium, in the reserved region.

10. The method of claim 7, wherein the step of unformatting the recording medium comprises determining that the backup region exists if the size of the usable region in the recording medium is smaller than the whole region of the recording medium, and unformatting the recording medium by restoring the backup data in the backup region.

11. The method of claim 7, further comprising determining that the backup region does not exist if the size of the usable region in the recording medium is larger than or equal to the whole region of the recording medium.

12. The method of claim 7, further comprising:
performing photoelectric conversion of an optical image formed through a lens into an electric signal, and processing the converted electric signal to produce an image signal;
compressing the image signal into an image file; and
compressing the file in a specified format and storing the compressed file in the recording medium.

13. A computer-readable recording medium including a whole region having a usable region and a backup region for storing data recorded with a program that performs:

designating a size of the backup region using at least one of a root region, a reserved region, and a file allocation table region;

performing a backup of a data which is included in the usable region in the designated backup region;

formatting the recording medium by initializing the usable region in which the data is recorded; and unformatting the recording medium by restoring the backup data in the backup region to the usable region;

wherein the data is used for file management and is included in at least one of the root region, the reserved region, and the file allocation table region.

* * * * *